United States Patent [19]

Gravelle

[11] Patent Number: 4,623,507
[45] Date of Patent: Nov. 18, 1986

[54] DEVICE FOR LOCATING THE POSITION OF CONTROL RODS OF A NUCLEAR REACTOR

[75] Inventor: Alain Gravelle, Le Plessis Robinson, France

[73] Assignee: Framatome & Cie., Courbevoie, France

[21] Appl. No.: 590,936

[22] Filed: Mar. 19, 1984

[30] Foreign Application Priority Data

Mar. 18, 1983 [FR] France ................. 83 04464

[51] Int. Cl.$^4$ ............................................ G21C 17/00
[52] U.S. Cl. ........................................ 376/258; 376/245
[58] Field of Search ................... 376/258, 252, 245

[56] References Cited

U.S. PATENT DOCUMENTS

| | | | |
|---|---|---|---|
| 3,237,150 | 2/1966 | Beck et al. ......................... | 376/258 |
| 3,303,457 | 2/1967 | Akesson ............................. | 376/258 |
| 4,284,473 | 8/1981 | Kasama .............................. | 376/245 |
| 4,290,859 | 9/1981 | Uesugi et al. ...................... | 376/258 |
| 4,394,345 | 7/1983 | DeBriere et al. ................... | 376/245 |

FOREIGN PATENT DOCUMENTS 3209062  9/1983  Fed. Rep. of Germany ...... 376/258

*Primary Examiner*—Salvatore Cangialosi
*Attorney, Agent, or Firm*—Pollock, Vande Sande & Priddy

[57] ABSTRACT

Device for locating the position of a nuclear reactor control rod which is suspended from a shaft (12) sliding vertically inside an adaptor tube (10, 11) under the effect of a screw-nut mechanism which comprises a nut-forming rotor (14) mounted to rotate around the vertical axis of the tube (10) and provided with a threaded bore in which is engaged a corresponding threaded part (13) of the shaft (12). The device comprises a transmitter-receiver (2) of a beam of ultrasonic waves in a horizontal direction intersecting the axis (16) of the shaft (12), a wave-reflecting cylindrical surface (3) provided on the side wall of the rotor and having a cam-shaped profile in its perpendicular cross-section comprising at least one part (31) forming a slope over a narrow angular sector (A) whose distance from the axis varies rapidly between a minimum and a maximum, devices (2, 4, 5, 6; 64, 65) for forming impulses each of which corresponds to the passage of the slope (31) in front of the beam of ultrasonic waves during rotation of the rotor (14) and for recording and counting the successive impulses in either direction of rotation of the rotor (14).

4 Claims, 6 Drawing Figures

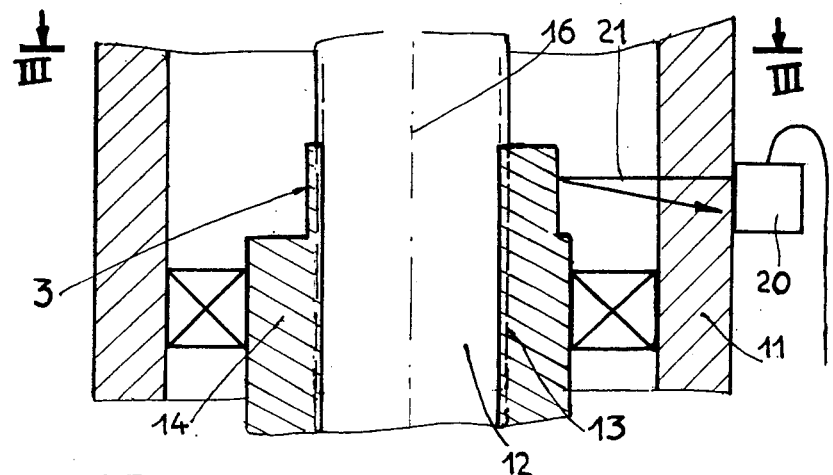
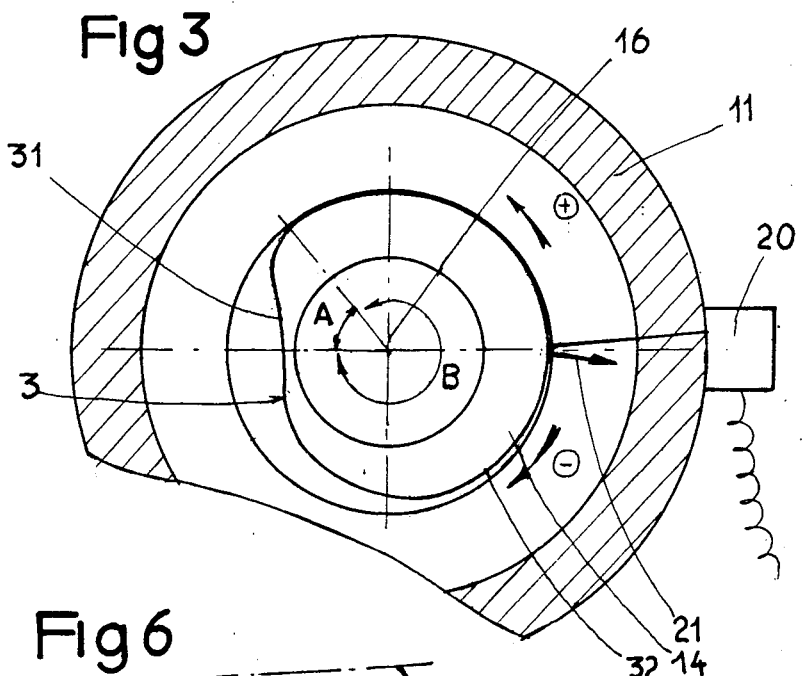
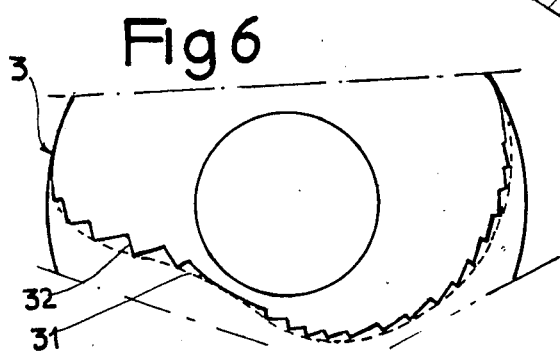

DEVICE FOR LOCATING THE POSITION OF CONTROL RODS OF A NUCLEAR REACTOR

FIELD OF THE INVENTION

The invention relates to a device for locating the position of a control rod of a nuclear reactor.

BACKGROUND OF THE INVENTION

In nuclear reactors, particularly of the pressurized water type, use is made of control rods suspended from shafts guided vertically in guide tubes which are fixed at their lower end to adaptor tubes passing through the reactor cover, and are closed in their upper part so as to preserve the integrity of the pressurized enclosure. Each tube is associated with mechanisms permitting the shaft to move vertically to raise or lower the corresponding control rod.

The position of each control rod, and consequently of the suspension shaft, must be located continuously, and various devices are employed for this purpose. These devices must of course operate without contact through the wall of the adaptor tube and the use of ultrasonic signals for this purpose has already been proposed.

PRIOR ART

It is possible, for example, to place at the upper part of the adaptor tube an ultrasonic signal transmitter-receiver which sends a beam vertically towards the upper end of the suspension shaft and picks up the reflected beam, the measurement of the time of propagation giving an indication of the height of the shaft.

Owing to the fact that the propagation velocity of the ultrasonic wave varies with the temperature, such a method is only valid at a constant temperature unless a temperature-related correction is introduced in the measurement. This results in possibilities of errors.

In another known device which is the subject of French Patent Application 81/02,096, filed on Feb. 4, 1981 by the applicant company, direct measurement of the position of the shaft is replaced by counting the number of steps of movement of the shaft in one or the other direction.

In fact, the mechanisms for controlling the movement of the suspension shaft usually operate stepwise and, by counting the number of upward or downward movement steps and knowing the step height, it is possible to deduce an indication of the position of the shaft and consequently of the control rod.

The device described in the above-mentioned patent application applies this process to motion mechanisms having a ratchet. In devices of this kind, in fact, each suspension shaft is equipped on its side wall with grooves extending over a height which corresponds to the height of travel of the control rod. On the corresponding adaptor tube are placed mechanisms comprising ratchets which engage in the grooves of the shaft, enabling the latter to be raised or lowered and to be held in position. The shaft therefore rises or descends in a succession of movements each corresponding to the height of one tooth, and after each of which it pauses. In the device forming the subject to the preceding patent application, the pauses are marked when the speed of movement of the shaft is measured and the number of movements of the shaft in one direction or the other is thus counted.

Such a device cannot therefore be employed when the movement takes place in a continuous manner, i.e. without periodic pauses. This, in point of fact, is the case in other devices which employ screw-nut mechanisms.

In this case, the shaft is equipped on its side wall with a threaded portion which engages in a corresponding threaded bore provided in a rotor forming a nut which surrounds the shaft and is mounted to rotate inside the guide tube about the vertical axis of the latter, the rotational movement of the nut in one direction or the other being controlled by a mechanism or a magnetic coil mounted on the guide tube.

SUMMARY OF THE INVENTION

The invention relates to a locating device which is adapted for a screw-nut displacement system and permits the position of the shaft to be located by counting the number of steps of movements which have been executed upwards or downwards.

The locating device according to the invention comprises a transmitter-receiver of a beam of ultrasonic waves in a horizontal direction intersecting the axis of the shaft, a wave-reflecting cylindrical surface arranged on the side wall of the rotor and having in its perpendicular cross-section a cam-shaped profile comprising, in a narrow angular sector, at least one portion forming a slope whose distance from the axis varies rapidly between a minimum and a maximum, a means for producing impulses each of which corresponds to the passage of the slope in front of the beam of ultrasonic waves during the rotation of the rotor, and means for recording and counting the successive impulses in one or the other direction of rotation of the rotor.

Preferably, the distance between the axis and the reflecting surface, measured in the radial plane of the beam, varies linearly between a minimum and a maximum as a function of the angle of rotation around the axis, on the one hand in the angular sector corresponding to the slope and on the other hand over the remainder of the cam profile.

In a particular embodiment, the means for producing impulses comprises a device for measuring the duration of propagation of the ultrasonic waves between the transmission and the reception of the echo reflected at the rotor, a device for producing a signal derived from the duration of propagation as a function of time, a device for comparing the derivative signal with two positive thresholds and two negative thresholds to eliminate, respectively, background noise and parasitic noise in both directions, a means for counting successive signals which are included between two thresholds of the same sign and a means for producing a positive impulse of a negative impulse each time that the number of successive signals of the same sign exceeds a given number.

BRIEF DESCRIPTION OF THE DRAWINGS

The invention will be better understood from the following description of a particular embodiment, given by way of example and shown in the attached drawings.

FIG. 2 shows, in axial cross-section and on an enlarged scale, the rotor part associated with the ultrasonic transmitter-receiver.

FIG. 3 is a plan view along III—III of FIG. 2.

FIG. 6 is a detailed view on an enlarged scale showing a more refined embodiment.

DETAILED DESCRIPTION

Figure 1:
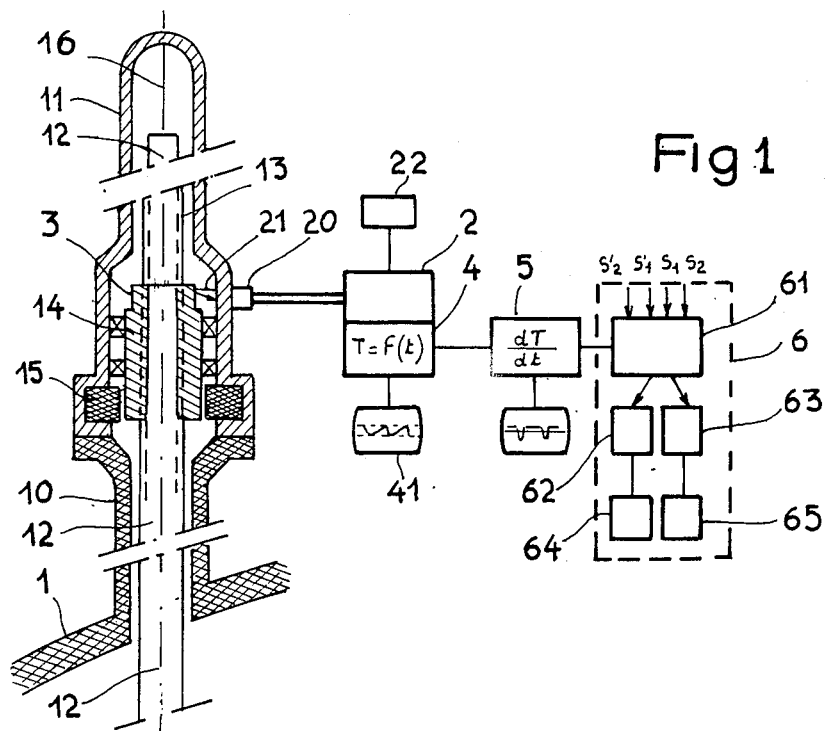
FIG. 1 shows diagrammatically a control rod driving mechanism associated with the locating device according to the invention.

FIG. 1 shows diagrammatically a nuclear reactor vessel cover through which passes an adaptor tube 10 onto which is fixed a guide tube 11 which is closed in its upper portion. The control rod, which is not shown, is suspended from a shaft 12 sliding vertically inside the adaptor tube 10 and the guide tube 11.

The upper part of the suspension shaft 12 is equipped, over a height which is greater than the vertical displacement of the control rod, with a thread 13 which is engaged on an internally threaded bore provided in a rotor 14 which forms a nut. The rotor 14 is mounted to rotate inside the guide tube 11 around the axis of the latter, and is driven in rotation by a mechanism or an electromagnetic coil 15 which cooperates with a corresponding component provided on the rotor 14. The latter is locked vertically relative to the guide tube 11 while the threaded shaft 12 is locked in rotation and can move vertically. As a result, each revolution of the rotor in one direction or the other causes the shaft to move upwards or downwards over a height which corresponds to the thread pitch. Consequently the upward or downward movement of the suspension shaft can be measured by counting the number of revolutions made to the right or to the left by the rotor.

For this purpose, according to the invention, a transmitter-receiver device 2 is used which, as shown in FIGS. 2 and 3, transmits a beam of ultrasonic waves in a horizontal direction intersecting the axis 16 of the guide tube and of the suspension shaft. This beam 21 encounters a cylindrical surface 3 which is provided on the side wall of the rotor 14. The generatrices of the cylindrical surface 3 are parallel to the axis 16 and their distance from the axis varies rapidly over a fairly narrow angular sector A and slowly over the complementary angular sector B. The cylindrical surface 3 thus forms a cam comprising a part 31 which forms a slope corresponding to the angular sector A.

The transmitter-receiver device 2 is associated with a transducer 20 which is fixed to the wall of the guide tube 11 and which transmits the beam of ultrasonic waves 21 in the direction of the axis 16 and receives the echo reflected by the cylindrical surface 3. The transmission frequency of the ultrasonic signals is controlled by a frequency selector 22. High-frequency transducers are employed to obtain a good resolution, for example a frequency greater than 5 MHz which has very good attenuating characteristics.

Figure 4:
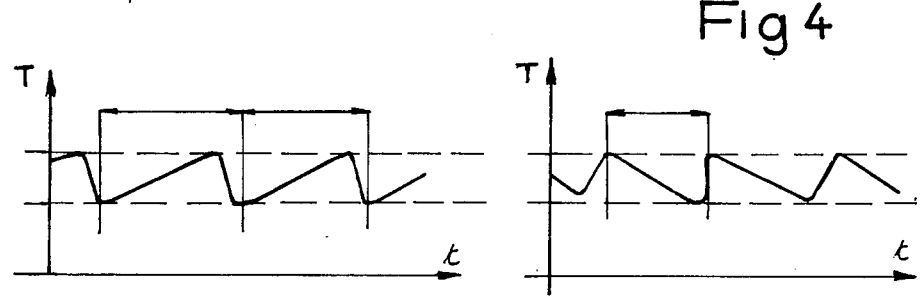
FIG. 4 is a diagram showing the variation of the duration of propagation of sound as a function of time, for a rotation in a positive direction on the left and for a rotation in a negative direction on the right.

The duration of propagation of each wave, i.e. the time which elapses between the transmission and the reception, is measured by a device 4 which therefore produces a wave-form signal representing the variation of the duration of propagation T as a function of real time and which is shown in the diagrams of FIG. 4, on the right side of the figure for a rotation in the positive direction, from right to left, and on the left side of the figure for a rotation in the negative direction, from left to right.

This diagram can, if appropriate, be reproduced on a video screen 41 connected to the device 4.

Each time that an ultrasonic wave is transmitted by the device 2 and the transducer 20, the device 4 transmits an analogue signal $T=f(t)$ which is matched by a derivative signal $dT/dt$ representing the speed of variation of the duration of propagation and produced by a derivative device 5. The device 5 can, for example, be connected to a computer and can compute the derivative by successive subtractions of amplitudes.

Figure 5:
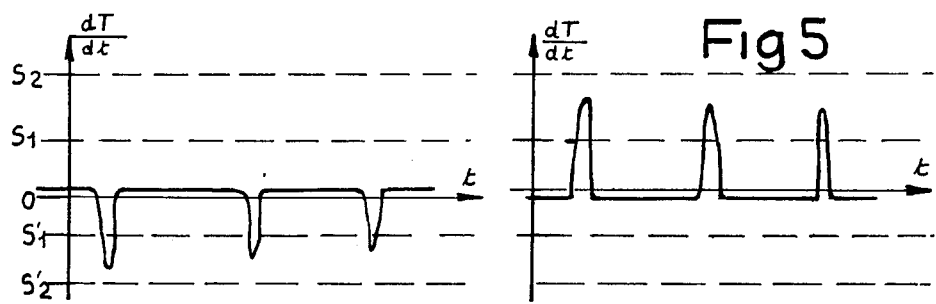
FIG. 5 is a diagram showing the time derivative of the duration of propagation for a rotation in a positive direction or in a negative direction.

The derivative device 5 thus transmits at regular intervals derivative signals whose variation with time is shown in the diagrams of FIG. 5, on the right for a rotation in the positive direction and on the left in the negative direction.

The profile of the cam formed by the cylindrical surface 3 of the rotor is shaped so that the distance between the generatrices and the axis varies linearly with the angle of rotation. For a rotation at constant speed, the derivative signal therefore comprises a base line 51 corresponding to the speed of variation of the distance relative to the axis and a peak 52 corresponding to the passage of the slope 31 in front of the transducer 20, which is reflected by a sudden variation in the time of propagation and consequently in the derivative signal. The latter is shown in the diagrams of FIG. 5, on the left for a rotation in the negative direction and on the right in the positive direction. To each passage of the slope 31 in front of the ultrasonic beam 21 there corresponds a peak 52 which, taking account of the shape which is given to the cam 3, is positive for a rotation in the positive direction and negative for a rotation in the negative direction. By counting the number of peaks 52 which are produced during the movement of the shaft, a count is thus obtained of the number of revolutions of the rotor and consequently the number of threaded pitches by which the shaft has risen or descended. This pitch being known, it is then possible to deduce the amplitude of the movements of the control rod.

To count the number of impulses corresponding to the peaks 52, use is made of a device 6 shown in FIG. 1. This comprises essentially a comparison device 61 which receives the derivative signals transmitted by the derivative device 5 and compares them with two positive thresholds, the lower S1 and the upper S2 respectively and to two negative thresholds, the lower S'1 and the upper S'2 respectively. The lower threshold levels, the positive S1 and the negative S'1, correspond to the possible amplitude of the background noise. The upper threshold levels, the positive S2 and the negative S'2, correspond to maximum amplitude, in the positive or negative direction, of the derivative signals produced by the rotation of the cam, and can be regulated in an appropriate manner depending on the speed of rotation of the rotor and the gradient of the slope 31. Signals whose amplitude is higher than this level therefore correspond to parasitic noises. Moreover, the lower thresholds S1 and S'1 have an amplitude which is higher than that of the derivative signal corresponding to the part 32 of the cam 3. This assures that the derivative signals whose amplitude is between the thresholds S1 and S2 or S'1 and S'2 correspond to the passage of the slope 31 in front of the transducer 20. These signals, after being compared in the device 61, are accumulated in two counters 62,63 one of which corresponds to the positive signals and the other to the negative signals. Consequently, depending on the direction of rotation of the rotor, with each revolution one or the other of the counters 62,63 receives and accumulates the signals.

The width of the peak 52 corresponds to the duration of the passage of the slope 31 in front of the transducer 20 and is thus a function of the speed of rotation of the rotor and of the amplitude of the angular section A. It is possible, however, to define, depending on the wave transmission frequency, a minimum number of reflected signals which must be received by the transducer with each passage of the cam. This minimum number is memorized by the counters 62,63 and each of these sends an impulse to an adder 64 or 65 each time that the minimum number of signals corresponding to a peak is exceeded. The counters 62 and 63 are reset to zero at regular intervals whose spacing corresponds to a revolution of the rotor, so that each counter can take into account only the signals corresponding to one and the same peak, i.e. to the passage of the slope.

The two adders 64 and 65 thus make it possible to know the number of revolutions executed by the rotor in one direction of rotation or in the other, and consequently to derive from these the amplitude of relative upward or downward movements of the control rods, enabling their position to be located relative to a known starting position.

The device which has just been described in detail is, of course, given only by way of example and other means of counting the number of revolutions of the screw can be envisaged. The arrangements described can moreover be subject to variations without departing from the scope of the claims.

Thus the profile of the cam 3 could be refined in the manner shown in FIG. 6.

In this case the slope 31 consists of a series of steps 32 each of which has a planar face whose normal passes substantially through the axis 16 of the shaft 12 so that each face 32 is approximately perpendicular to the ultrasonic wave beam 21 at the instant of its passage in front of the latter. As a result, the reflection of the waves takes place under better conditions. A filter treatment makes it possible to flatten the response curve.

I claim:

1. In a nuclear reactor comprising a set of control rods each suspended from a shaft mounted for vertical sliding movement inside an adaptator tube, a screw-nut mechanism being mounted on each adaptator tube for controlling the movement of the shaft of the corresponding control rod and each screw-nut mechanism comprising a rotor in the form of a nut mounted to rotate around the vertical axis of the tube and having a threaded bore in which a corresponding threaded part of the shaft engages, and means for driving the rotor in rotation in one direction or the other, the nut being locked in vertical movement and the shaft being locked in rotation, a device associated to each of said control rods for locating its position and comprising a transmitter-receiver of a beam of ultrasonic waves propagating in horizontal direction intersecting the axis of the shaft, the improvement wherein
   (a) said device for locating the position of a control rod further comprises a wave reflecting, generally cylindrical surface (3) arranged on the side wall of said rotor (14) and having in cross-section a cam-shape profile comprising at least one part forming a slope (31) over a narrow angular sector (A), the distance of said one part from the axis (16) of said shaft varying rapidly between a minimum and a maximum within said angular sector;
   (b) means for receiving the waves reflected by said reflecting surface and for producing an impulse, each time said slope passes through the beam of ultrasonic waves during rotation of said rotor; and
   (c) means for recording and counting the successive impulses in one or the other direction of rotation of said rotor.

2. Improvement according to claim 1, wherein the distance between said axis and said reflecting surface (3) measured in the radially plane of said beam (21) varies linearly between said minimum and said maximum as a function of the angle of rotation around said axis, on the one hand in the angular sector (A) corresponding to the slope (31) and on the other hand over the remainder of the cam profile.

3. Improvement according to claim 1, wherein said means for producing impulses comprises a device (2, 4) for measuring the duration of propagation of said ultrasonic waves between the transmission and the reception of an echo reflected at said rotor, a device (5) for producing a signal derived from the duration of propagation as a function of time, a device (6) for comparing the derivative signal with two positive thresholds (S1, S2) and two negative thresholds (S'1, S'2) to eliminate, respectively, background noise and parasitic noise in both directions, means (62, 63) for counting the successive derivative signals included between two thresholds with the same sign, and for producing a positive impulse or a negative impulse each time the number of successive signals of the same sign exceeds a given number, and means (64, 65) for adding, respectively, said positive and negative impulses.

4. Improvement according to claim 1, wherein said slope (31) consists of a series of steps (32) each having a planar beam-reflecting face (21) whose normal is directed substantially towards said axis (16) of said shaft (12).

* * * * *